United States Patent [19]
Kitrell

[11] 4,436,351
[45] Mar. 13, 1984

[54] APPARATUS FOR MOUNTING ELECTRONICS EQUIPMENT

[75] Inventor: John V. Kitrell, Lincoln, Nebr.

[73] Assignee: Radio Engineering Service, Inc., Omaha, Nebr.

[21] Appl. No.: 323,542

[22] Filed: Nov. 20, 1981

[51] Int. Cl.³ .................... A47B 77/08; F16L 5/00
[52] U.S. Cl. ............................ 312/223; 312/185; 312/242; 248/56; 248/291
[58] Field of Search ............... 312/223, 242, DIG 33, 312/100, 284, 286, 185, 186; 248/291, 293, 56

[56] References Cited

U.S. PATENT DOCUMENTS

| | | | |
|---|---|---|---|
| 454,265 | 6/1891 | Fezandie | 312/185 |
| 2,476,850 | 7/1949 | Fiori et al. | 248/291 |
| 2,494,814 | 1/1950 | Huth | 248/56 |
| 2,565,661 | 8/1951 | Lidz | 312/7.1 |
| 3,112,968 | 12/1963 | Cotton et al. | 312/223 |
| 3,253,871 | 5/1966 | Karper | 312/284 |
| 3,285,551 | 11/1966 | Tschanz | 248/56 |
| 4,103,980 | 8/1978 | Silva | 312/185 |
| 4,258,961 | 3/1981 | Ackeret | 312/242 |

*Primary Examiner*—Victor N. Sakran
*Attorney, Agent, or Firm*—Zarley, McKee, Thomte, Voorhees & Sease

[57] ABSTRACT

An apparatus for mounting electronics equipment is described which is particularly well-suited for mounting a radio or the like on a tractor or the like. The apparatus comprises a substantially U-shaped bracket including a bottom mount portion having first and second spaced-apart side walls extending upwardly therefrom. A hollow case is selectively pivotally mounted on the side walls of the bracket and is received therebetween. The bottom portion of the case is open and is adapted to receive the electronics equipment therein. The case may be pivotally moved between open and closed positions relative to the bracket. When the case is in the closed position, the case extends over and around the electronics equipment. When the case is in its open position, the electronics equipment is exposed to enable the operator to operate the same.

4 Claims, 5 Drawing Figures

APPARATUS FOR MOUNTING ELECTRONICS EQUIPMENT

BACKGROUND OF THE INVENTION

This invention relates to an apparatus for mounting electronics equipment and more particularly to an apparatus for mounting radios or the like on tractors, combines, etc.

Farm equipment such as tractors and combines frequently are provided with radios for the operator's convenience and pleasure. A problem exists with the conventional tractor radios in that they are exposed to weather elements which frequently damage the same.

Therefore, it is a principal object of the invention to provide an apparatus for mounting electronics equipment.

A further object of the invention is to provide an apparatus for mounting electrons equipment on farm equipment or the like including means for shielding the electronics equipment from weather elements when the electronics equipment is not being used.

A still further object of the invention is to provide an apparatus for mounting electronics equipment including means for connecting the power cord to the electronics equipment and including means for extending the antenna therefrom.

A still further object of the invention is to provide an apparatus for mounting electronics equipment which is economical of manufacture, durable in use and refined in appearance.

These and other objects will be apparent to those skilled in the art.

SUMMARY OF THE INVENTION

Figure 1:
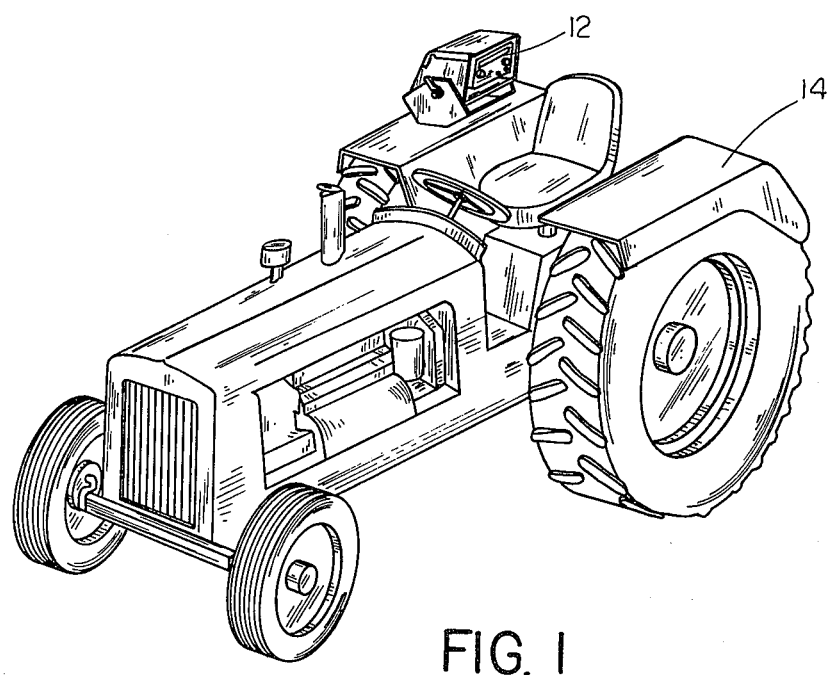
FIG. 1 is a perspective view of a tractor having the apparatus of this invention mounted thereon.
Figure 2:
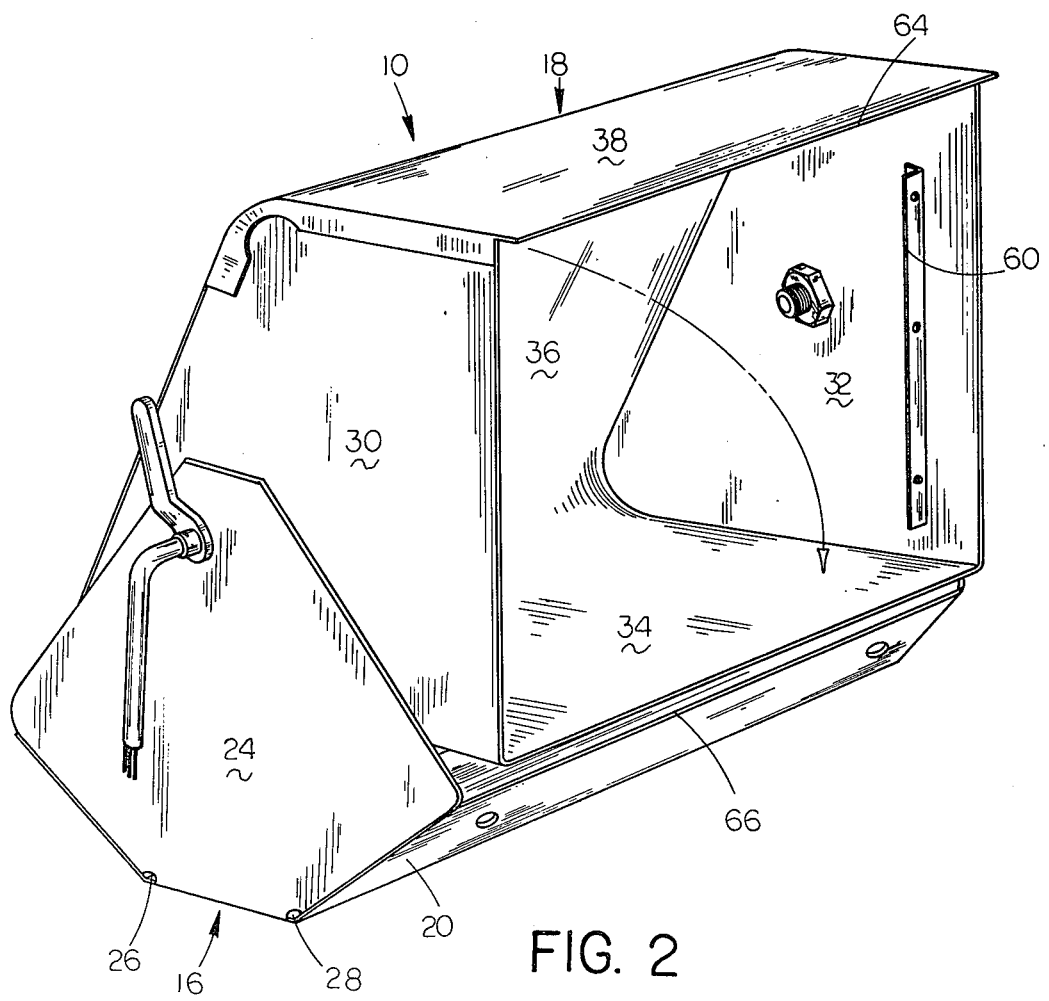
FIG. 2 is a front perspective view of the apparatus of this invention.

A means for mounting a radio or the like to a tractor or the like is described including a substantially U-shaped bracket which is secured to the tractor. A hollow case is selectively pivotally mounted on the bracket and finds a compartment area therein in which the radio is mounted. The case is pivotally movable between closed and open positions. When the case is in its closed position, the case extends over and around the radio to protect the same from the elements of weather. When the case is in its open position, the open bottom end of the case is presented to enable the operator to gain access to the radio.

DESCRIPTION OF THE PREFERRED EMBODIMENT

The apparatus of this invention is referred to generally by the reference numeral 10 and is designed to mount a radio 12 on farm equipment such as a tractor 14. Although the apparatus of this invention is ideally suited for mounting electronics equipment on a tractor or the like, it should be noted that the apparatus may be used in any environment where it is desired to shield equipment from the weather elements.

Apparatus 10 generally comprises a bracket 16 having a case 18 selectively pivotally mounted thereon. Bracket 16 includes a bottom portion 18 having front and back walls 20 and 22 extending upwardly and outwardly therefrom respectively. Bracket 16 also includes spaced-apart side walls 24 and 26 which extend upwardly from the ends of the bracket as seen in the drawings. Bracket 16 is of one-piece construction. It should be noted that the lower edges of the side walls 24 and 26 are welded or otherwise secured to the ends of the walls 20 and 22. It should also be noted that openings 27 and 28 are provided at each of the ends of the bracket to permit water to pass outwardly from the case if necessary.

Case 18 is also of one-piece construction and includes side walls or portions 30 and 32, back wall or portion 34, top portion 36 and front wall or portion 38. It can be seen from the drawings that the top wall 36 and front wall 38 are provided with lips or flanges at the their ends which extend over the edges of the side walls 30 and 32 and which are secured thereto by spot welding or the like to further seal the interior of the apparatus.

Figure 5:
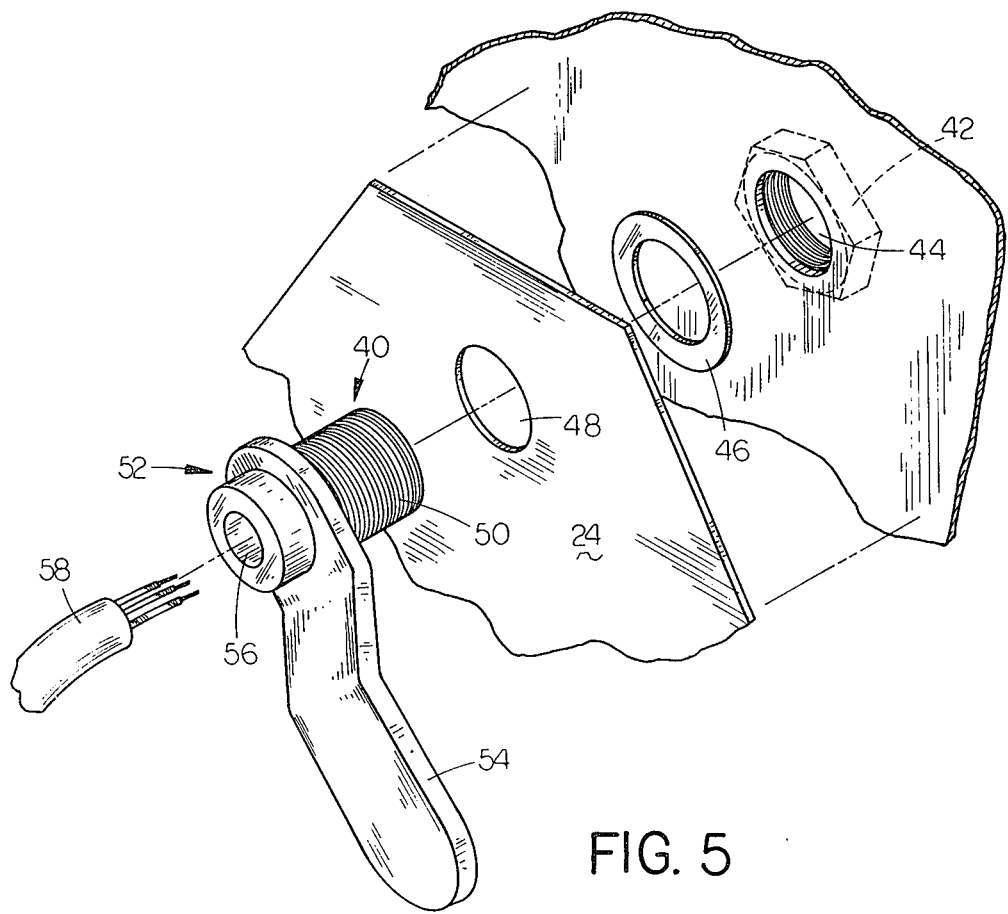
FIG. 5 is a partial exploded perspective view illustrating the means for pivotally securing the case to the bracket.

A pivotal mounting means 40 is provided on each of the walls 24 and 26 for pivotally mounting the case 18 to the bracket 16. Inasmuch as the mounting means 40 are identical, only one of the mounting means will be described. Nut 42 is welded to the inside surface of wall 30 and communicates with an opening 44 formed in the wall 30. Washer 46 is positioned between the exterior surface of wall 30 and the inside surface of wall 24. Wall 24 is provided with an opening 48 which is adapted to receive the threaded portion 50 of a tube bolt assembly 52. Handle 54 is secured to the tube bolt assembly 52 as seen in the drawings. Tube bolt assembly 52 includes an opening 56 extending therethrough which is adapted to receive either the power cord or antenna cord which is referred to generally by the reference numeral 58. Threaded portion 50 of tube bolt 52 is extended through the opening 48, through the washer 46 and threadedly secured to the nut 42. Thus, it can be appreciated that the tube bolt 52 may be rotated in a clockwise manner as viewed in FIG. 5 to draw the walls 24 and 30 together to maintain case 18 in various positions of its pivotal movement. It can be appreciated that the tube bolt 52 may be tightened to either maintain the case 18 in its closed or open positions.

Figure 3:
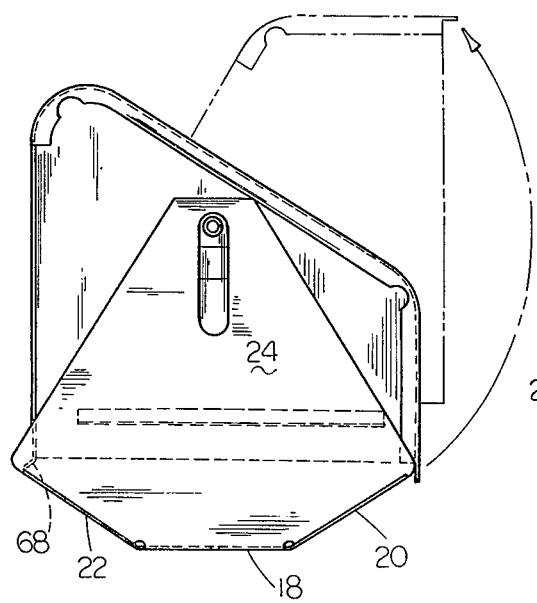
FIG. 3 is an end view of the apparatus with the broken lines illustrating the position of the case when in its open position.
Figure 4:
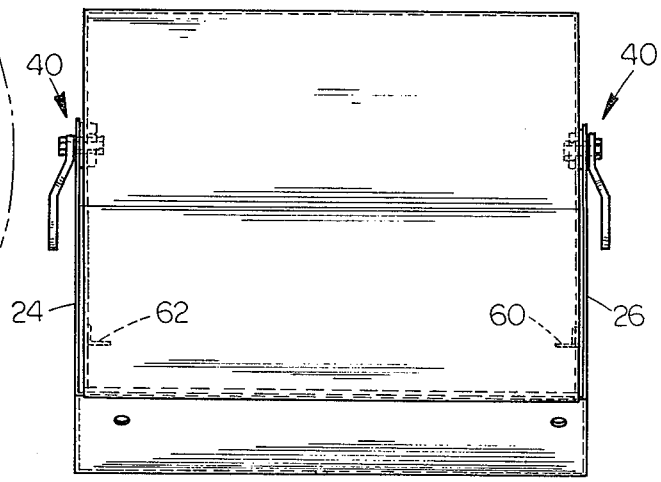
FIG. 4 is a front view of the apparatus in its closed position.

Case 18 is provided with a pair of spaced-apart brackets 60 and 62 secured to the inside surface of walls 32 and 30 respectively to which the radio 12 is secured. FIG. 1 illustrates the radio 12 being received within the interior of the case 18 with the case 18 being in the open position to enable the operator to operate the radio. When it is desired to close the case 18, the tube bolts at each end of the apparatus are loosened with the case 18 being pivotally moved from the position illustrated by broken lines in FIG. 3 to the position illustrated by sold lines in FIG. 4. After the case has been pivotally moved to its closed position, it is recommended that the tube bolts 52 again be tightened to positively maintain the case in its closed position.

When the case 18 is in the closed position, the case extends over and around the radio to protect the same from the elements of the weather. It can also be seen that the lower end 64 of front wall 38 is positioned outwardly of the upper end 66 of wall 20 to prevent water from flowing downwardly into the bracket. Back wall 22 is also provided with a flange 68 which extends upwardly and inwardly for engagement with the lower end of back wall 34 of case 18 to further weatherproof the enclosure. If water should enter the interior of the bracket 16, the water may flow outwardly therefrom through the openings 27 and 28. The bracket 16 may be secured to the tractor as illustrated in FIG. 1 or the walls 20 and 22 may also be secured to any portion of the tractor as required. In other words, the walls 18, 20 and 22 provide some versatility in the choice of mounting the case.

Thus it can be seen that a novel apparatus has been provided for mounting electronics equipment on a tractor or the like which accomplishes at least all of its stated objectives.

I claim:

1. An apparatus for mounting electronics equipment, comprising, a substantially U-shaped bracket comprising a bottom mount portion having first and spacing-apart side walls extending upwardly from said bottom mount portion, a hollow case selectively pivotally mounted on said side walls and being received therebetween, said case comprising first and second spaced-apart side portions having rearward and forward ends and upper and lower ends, a back portion extending between the rearward ends of said side portions, a top portion extending between the upper ends of said side portions, a front portion extending between the forward ends of said side portions, said case having an open bottom portion adapted to receive electronics equipment therein, means on said case for mounting the electronics equipment in said case, said case being selectively pivotally movable between open and closed positions relative to said bottom mount portion, said case, when in its open position, presenting said open bottom portion in a forwardly manner whereby said electronics equipment is exposed for operation, said case, when in its closed position, extending over and around the electronics equipment to shield the electronics equipment from the elements of weather, a pivotal mounting means pivotally connecting each of said side portions of said case to one of the side walls of said bracket, at least one of said pivotal mounting means including selective locking means for selectively maintaining said case in its said open and closed positions.

2. The apparatus of claim 1 wherein a power cord extends inwardly through one of said pivotal mounting means.

3. The apparatus of claim 2 wherein an antenna wire means extends outwardly through the other of said pivotal mounting means.

4. The apparatus of claim 1 wherein said bracket also has a front wall extending upwardly and forwardly from said bottom mount portion and a back wall extending upwardly and rearwardly from said bottom mounting portion, the lower end of said back portion of said case having a protruding lip portion adapted to engage the upper inner surface of said back wall of said bracket when said case is in its closed position, the lower end of said front portion of said case engaging the upper end of said front wall of said bracket when said case is in its closed position.

* * * * *